United States Patent

Trueblood

[11] Patent Number: 5,752,551
[45] Date of Patent: May 19, 1998

[54] WIRE TWISTING APPARATUS

[76] Inventor: Joe Trueblood, 725 Naycor, San Antonio, Tex. 78210

[21] Appl. No.: 767,718

[22] Filed: Dec. 17, 1996

[51] Int. Cl.$^6$ .................................................. B21F 15/04
[52] U.S. Cl. ................................................ 140/118; 140/120
[58] Field of Search ........................ 140/93 A, 93.6, 140/118, 119, 120

[56] References Cited

U.S. PATENT DOCUMENTS

| D. 327,826 | 7/1992 | Neff . | |
|---|---|---|---|
| 353,535 | 11/1886 | Bunch | 140/120 |
| 1,181,297 | 5/1916 | Fenlason | 140/118 |
| 1,515,470 | 11/1924 | Foulder | 140/119 |
| 3,990,486 | 11/1976 | Quick . | |
| 3,991,796 | 11/1976 | Dvorak . | |
| 4,074,732 | 2/1978 | Wilkens | 140/120 |
| 4,842,025 | 6/1989 | Box et al. . | |
| 5,211,209 | 5/1993 | Geibel et al. . | |
| 5,379,809 | 1/1995 | Waulk . | |

FOREIGN PATENT DOCUMENTS 554050  4/1977  Russian Federation ................ 140/57

Primary Examiner—Lowell A. Larson
Attorney, Agent, or Firm—Novak Druce & Burt

[57] ABSTRACT

A hand-held wire twister including an upper portion having a handle engageable by an operator for imparting a twisting action to the wire twister. A lower portion has a wire strand engaging head that is coupled to the handle by an extension shaft. The wire strand engaging head flares outward from the extension shaft so that a perimeter of the head is greater that a perimeter of the shaft so that the head establishes a wire engaging portion of the wire twister. The wire engaging portion has at least two wire receiving channels cut thereinto for engaging at least two wire strands to be connectively intertwined by rotational motion of the wire twister; each channel engaging one or more wires. Each of the channels extends from an opening at the perimeter of the head toward a center of the head.

11 Claims, 3 Drawing Sheets

WIRE TWISTING APPARATUS

This application claims the benefit under 35 U.S.C. 119(e) of U.S. provisional application No. 60/008,846 filed Dec. 19, 1995.

FIELD OF THE INVENTION

This invention relates generally to hand tools used by electricians and other persons who must handle wiring configurations. More particularly, this invention relates to a hand tool used for twisting multiple wire strands of electrical conduit used in residential, commercial, and industrial applications.

BACKGROUND OF THE INVENTION

Electricians and other operators in the electrical field must conductively connect different wire strands from separate electrical conduits. Commonly, the several strands are intertwined together by a twisting action into a unified twist that is then often covered by a screw cap having internal threads that engage and secure the wire twist. Several different means are utilized to achieve the twisting of the several wires at a field site. One such means that is almost always available to a technician is manual manipulation using several fingers. In this practice, the several wires are positioned closely together and then a twisting action is applied that produces an entwined wire twist. For obvious reasons, this manual method has potentially harmful consequences for the operator. While all technicians endeavor to accomplish such wiring twists while lines are inactive and electricity is not being supplied, a dead condition is not always assured and may inadvertently result in a harmful shock to the operator. Furthermore, the exposed wires that must be placed in contact with one another during the twist may be sharp and potentially injurious to the unprotected fingers of the electrician. Still further, by manually twisting the wire there is no assurance of uniformity among individual twists; a condition that may be desirable if a specific cap with specific internal threaded dimensions is to be used. Finally, the limitations of using bare or gloved fingers may result in an ineffective twisting which is subsequently susceptible to disengagement of the several twisted wire strands.

In view of the drawbacks recognized with respect to manual twisting of wire conduit, several attempts have been made to provide twisting apparatus that alleviate some of the detrimental effects of twisting electrical wires by hand. One example of such an apparatus is disclosed in U.S. Pat. No. 4,842,025 issued to Box et al for a Wire Twisting Tool. In Box's wire twisting tool, a pair of jaws are utilized for clamping the wire ends and then imparting a twist with a drive unit that rotates the jaws relative to a handle grasped by the operator. A similarly configured grasping device is disclosed in U.S. Pat. No. 5,211,209 issued to Geibel et al for a Reversible Direction Wire Twisting Pliers. Like the example of Box, this device has a means for clamping or grasping the several wire strands to be twisted together and then pivoting that clamping mechanism with respect to a handle portion held by an operator. A third example of a wire twisting tool is found in U.S. Pat. No. 5,379,809 issued to Waulk for a Wire Twisting Device. In that invention, a head is provided upon a shafted hand tool wherein the interior of the head is specifically configured to receive several wire strands and hold the ends thereof fast during a twisting action so that when the tool is rotated, a combined wire twist is accomplished. The patents discussed hereinabove, together with other known patents, are listed in the accompanying Form 1449 which is supplied with a copy of each patent.

In view of the achievements described above with respect to providing wire twisting hand tools, it has been recognized that advancements may be made in the art to provide a hand tool that accommodates twisting of different sized or gauged wires, while simultaneously protecting the operator from potentially harmful shocks that can occur during the manipulation of electrically conductive wiring.

DESCRIPTION OF THE INVENTION

Figure 1:
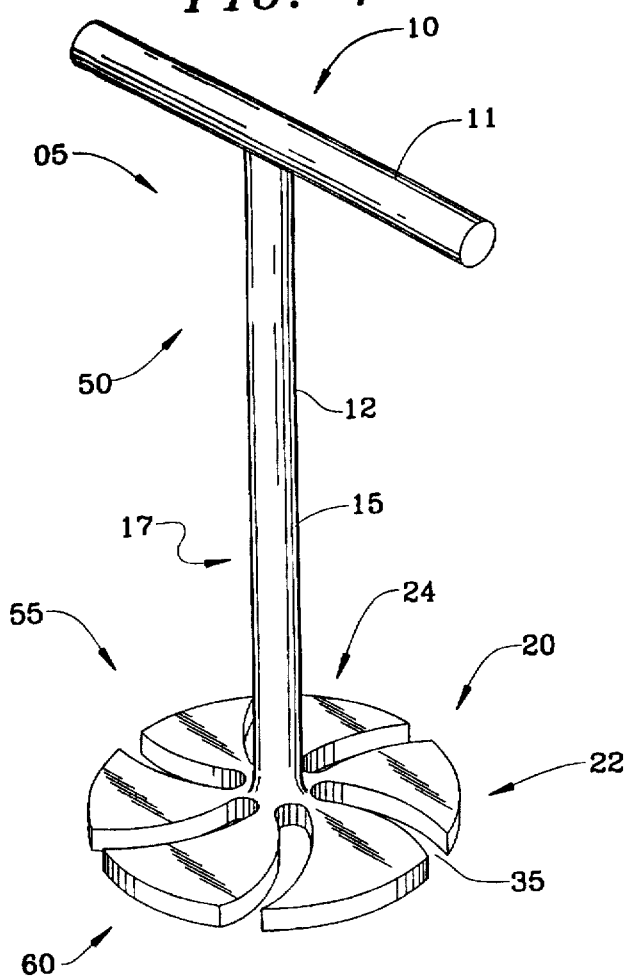
FIG. 1 is a perspective view of one embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and not for purposes of limitation. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation one to the other. Still further, those elements so described my be permanently connected together or releasably connected together.

Certain components may be described as being adjacent to one another. In these instances, it is expected that such a relationship so described shall be interpreted to mean that the components are located proximate to one another, but not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

The present invention includes several embodiments in which a manual hand tool 05 is provided for use in the electrical arts for twisting a plurality of wire strands into a combined wire twist that may be optionally capped, thereby providing a secured connection between the several twisted wire strands. The design of the present invention permits its use in different wiring situations wherein different wire strands are encountered. These different configurations may include a variable number of individual wire strands that are to be twisted together, and among those several wire strands varying sizes or gauges of wire may be present. In many, if not most applications, the wires will be uniformly sized, therefore a uniform wire twist will be more easily accomplished. The present invention, however, is suitable for use in situations where a plurality of wires are presented of different sizes that must be unified into a combined wire twist.

With respect to providing safety to the operator of the hand tool 05, an insulated handle 10 is provided for manual engagement by the electrician. By utilizing an insulating handle 10, the electrician is shielded from potential shocks should the wires be combined while live with electricity being supplied thereto. Additionally, an extension shaft 15 is provided between the insulated handle 10 and a wire strand engaging and manipulating head 20 to further distance the operator from the work area where the wiring is actually twisted into a combined wire mass.

Both the insulating handle 10 and the extension shaft 15 provide operational enhancements to the tool 05 in addition to providing safety features for the operator. Regarding the insulated handle 10, it is contemplated that the exterior surface 12 about which an operator is intended to grasp may be configured to facilitate its being manually grasped. Friction generating grooves or recesses may be included along the length of the handle 10. This is a design common to such hand tools as screw drivers. During the utilization of this design, an operator may accomplish a secure grasp of the handle 10 so that rotation of the hand tool 05 is easily accomplished without slippage. Alternatively, it is contemplated that the surface 12 of the handle 10 may merely be roughened so that frictional engagement is accomplished between the operator's hand or glove and the body of the handle 10.

The extension shaft 15 not only distances the operator from the work space, but it also provides a means by which otherwise difficult areas may be accessed for the purpose of wire twisting. In many situations, the several wire strands to be twisted together may be located in remote areas of a physical structure within tight spaces. An example of such a situation is wiring that may be located within framed walls or flooring structures between braces and away from the position of an operator attempting to accomplish wiring within those narrowly spaced areas. By including the extension shaft 15, the present invention allows the operator to direct the manipulating head 20 of the hand tool 05 into the required work space while the hands of the operator remain distanced therefrom in an area where manipulation is facilitated. In an alternative embodiment, it is contemplated that the shaft 15 may be extendable by telescopic or other suitable means.

The handle 10 should be, and the shaft 15 may optionally be constructed from electrically insulative material. Examples of such insulative materials include plastic substances, hard rubbers and derivatives therefrom; potential materials are ceramics, as well as other rigid and semi-rigid insulative construction materials.

Alternatively, the handle 10 may be constructed from material of any nature and be coated at its exterior surface 12 with an insulative substance. Normally, this substance will be a rubber that is initially in a liquid state and it is into this liquid rubber that the portion of the handle 10 to be coated is dipped. The liquid rubber then solidifies forming the protective coating about the handle 10 which is grasped by the operator. Not only does the coating provide a conductive barrier to deter shock effects to the operator, but it also provides a friction inducing surface for his or her grasp.

The handle 10 of the tool 05 may be configured to receive different shafts 15 and thereby facilitate the exchange of different wire manipulative heads 20. An example would be a screw driver type handle within which a receiving hollow tubular cavity is provided and a top end or extension of the shaft 15 is insertable therein for connection therewith. Obviously, means must be supplied to prevent relative rotation between the handle 10 and the shaft 15. Among other possible configurations, it is anticipated that the shaft 15 may have a flange or key that mates with a receiving recess or channel running the length of the tubular receiver within the body of the handle 10. Alternatively, the shaft may be pinned therein or otherwise fixed against relative rotary movement with respect to the handle.

The wire manipulating head 20 is coupled to a lower end of the shaft 15 distally located from the handle 10. It is contemplated that the head 20 may be permanently fixed to the lower distal end of the shaft 15 or it may be releaseably connected for exchange with other head 20 pieces upon the same shaft 15. Alternatively, as has been previously described, the utilizations of different shafts 15 upon a single handle 10 may be accomplished by the releasable engagement of the shaft 15 at the handle's 10 body.

Figure 2:
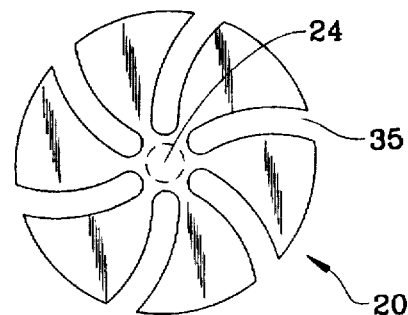
FIG. 2 is a bottom plan view of the embodiment of FIG. 1.

Referring to FIGS. 1 and 2, one embodiment of the head 20 is shown. As may be appreciated from the illustration, apertures or channels 35 causing a fan blade resemblance are provided that by their configuration facilitate the securement and twisting of a plurality of wires. Each aperture 30 may have a larger cross dimension near the exterior or parameter of the head 20. As the channel 35 extends towards the center of the head 20, the cross dimension or width of the channel 35 reduces so that the channel 35 is narrower toward the shaft 15 away from the exterior edge. In this manner, varying guaged or sized wires may be placed within the individual channels 35 and caused to slide or travel toward the center of the twisting head 20. When the width of the channel 35 is sufficiently narrowed or necked, the wire placed therein will be grasped or pinned within the head 20 and held for subsequent twisting. In this manner, the configuration of FIG. 1 is adapted to be useable on different sized or gauged wires that may be encountered.

The different wires may be variously sized at a connective junction so that several sized wires may be included in a single twisting operation within a single head having like configured channels 35.

Alternatively, the shaft 15 may be permanently fixed to the handle 10 and the head piece 20 may or may not be permanently located at the lower end of the shaft 15 distally located from the handle 10. Should a particular use require bracing of the head 20, one or more rigid braces may be incorporated between the shaft 15 and the head piece 20. If bracing is included about the head piece 20, however, it is anticipated that the head piece 20 will be permanently connected to and located upon the shaft 15.

The head piece 20 may include differently sized round apertures 40 therethrough. There are similarly and differently sized apertures 40 so that a plurality of both similarly and differently sized wires may be accommodated within a single head piece 20 by insertion therein. During the twisting process, the wires will bind against the perimeters of the apertures so that they do not become dislodged therefrom. Different numbers of apertures may be provided, as well as differently sized apertures to accommodate different situations encountered while either installing or repairing electrical wiring. By inclusion of the different sized round apertures on a single head piece 20, differently sized wires may by combined into a twisted wire mass by the one twisting tool 05.

Figure 5A:
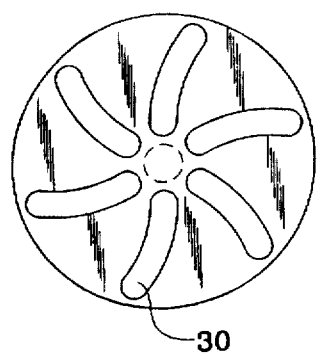
FIGS. 5A-5C are bottom plan views of alternative embodiments of the wire receiving apertures through a head plate of the present invention.
Figure 5B:
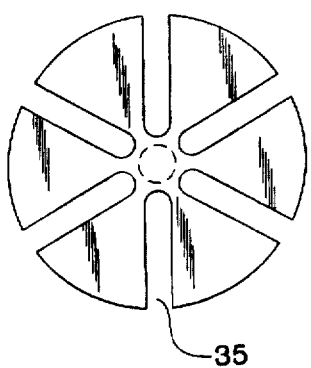
Figure 5C:
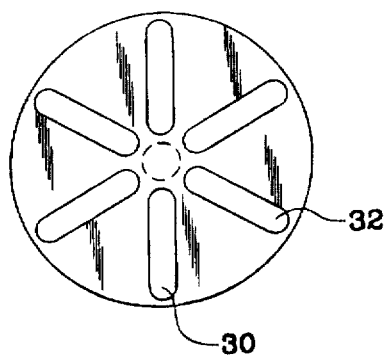

In view of the various wiring situations that may be encountered in wiring configurations, FIGS. 5A–5C illustrate alternative aperture 30 and channel 35 designs that may be incorporated into the manipulating wire head 20. Not only is it contemplated that round apertures 30 may be utilized, but elongated and oblong slots 45 may be similarly utilized. In the case of elongated apertures 45, it is anticipated that alternative embodiments may include a narrowing or necked configuration from a wider cross dimension to a narrower cross dimension within which the wires will be pinned when slid from the larger end to the narrower end. In these configurations, the elongate slots 45 perform similarly to the channels 35 of FIG. 1. Furthermore, the solid portions of the head 20 about the shaft 15 establish spaces between the wires so that when twisted, the wires remain disengaged one from one another at the head piece 20. By keeping the wire strands separated and untwisted at their most distal ends or tips after being clipped and disengaged from the twister 05, those wire tips may be further manipulated or altered. Additionally, it is contemplated that the wire tips may be cut therefrom in an effort to potentiate the twisted connection and assure its security.

Figure 6:
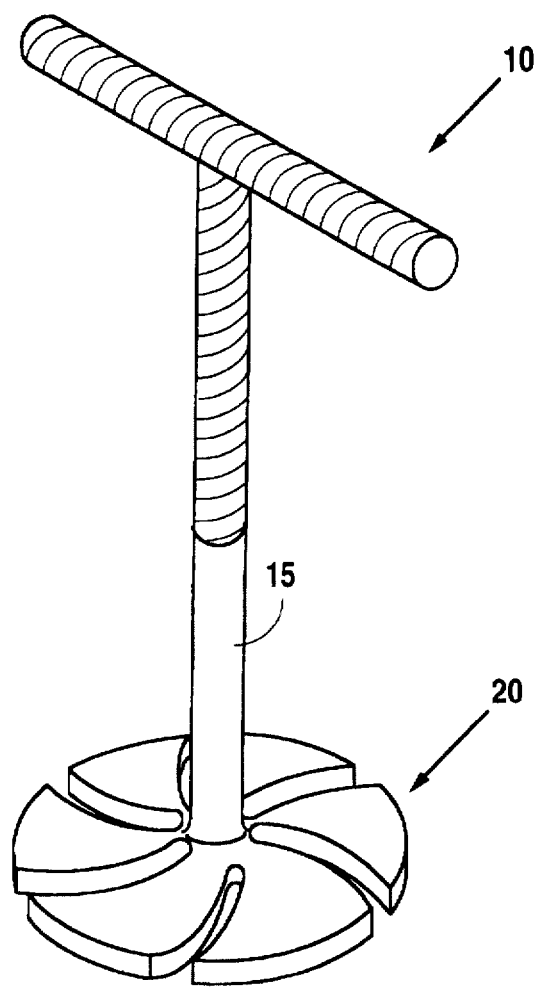
FIG. 6 is a perspective view of an alternative embodiment of the present invention.
Figure 7:
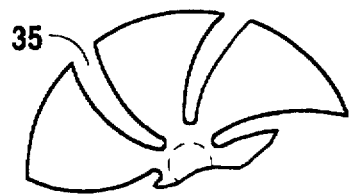
FIG. 7 is a bottom plan view of the embodiment of FIG. 6.

FIG. 1 illustrates one embodiment of the hand-held wire twister 05 having a T-shaped handle 10 including a cross-member 11 that is generally horizontally located at the top end of upper portion 50. The upper portion 50 is coupled to the lower portion 55 by the extension shaft 15. The upper portion 50 comprises the handle 10 and the lower portion 55 comprises the wire strand engaging head 20. As may be appreciated in FIG. 1, the head 20 has a perimeter 22 that in the illustration of FIG. 1 is substantially circular. The head 20 has a center 24 at which the extension shaft 15 is coupled. This couplement is made at the center 24 of the head 20 thereby forming a hub in the wire engaging portion 60 of the wire twister 05. A wire receiving channel 35 is cut into the head 20 and extends from an opening from the perimeter 22 of the head 20 on a curved elongate path toward the center 24 of the head 20. In the embodiment illustrated in FIGS. 1 and 2, the channel 35 has a uniform width along its elongate length. This may be contrasted to the alternative embodiment illustrated in FIGS. 6 and 7 wherein the wire receiving channel 35 is tapered from a broad width at the opening adjacent to the perimeter 22 of the head 20 and tapers or narrows toward the center 24 of the head 20. By providing the taper in the channel 35, much like the taper in the oblong and elongated slots 32 which is an alternative embodiment of the receiving apertures 30, wires of varying gauges are accommodated and securable during a twisting procedure. FIG. 6 also illustrates an insulated handle 10 wherein the exterior surface 12 is coated with an insulative rubber material.

Figure 3:
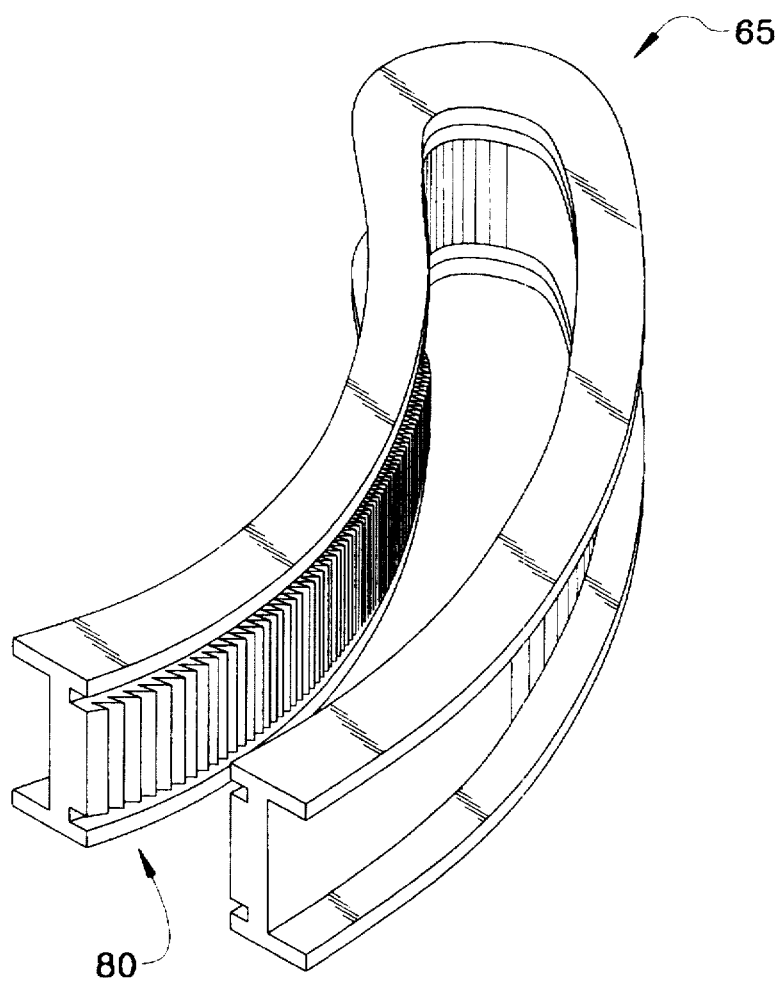
FIG. 3 is a perspective view of one embodiment of an insert for a channel or groove cut in the head of a wire twister of the present invention.
Figure 4:
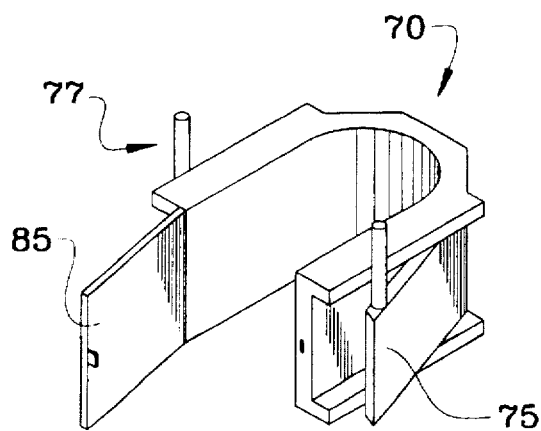
FIG. 4 is a perspective view of a sled configured for one-way locking travel within the insert of FIG. 3.

An optional enhancement of the wire twister 05 is shown in FIGS. 3 and 4. FIG. 3 illustrates an insert 65 for mating insertion and engagement into a channel 35 typified in FIGS. 1 and 2. The insert 65 includes opposed interior surfaces, each comprising a series of teeth 80 that are inclined on an outwardly facing surface at an angle inwardly slanted toward the center 24 of the head 20. Each tooth also has a flat surface that faces toward the center 24 of the head 20 on a backside of the slanted surface. A carrier 70 is engageable within the insert 65 for one way travel during rotational operation of the twister 05. Ears 75 are provided on the carrier 70 that are biased in a flexible manner outwardly for engagement with the opposed series of teeth 80. Each series of teeth 80 is substantially symmetrical to the opposing series on the opposite side of the channel 35. Through engagement between the ears 75 and teeth 80, a one way ratcheted movement is achieved between the carrier 70 and the channel 35.

The carrier 70 includes an openable and closeable enclosure within which one or more strands of wire may be captured. In the illustration on FIG. 4, the enclosure is established by a flexible door that may be latched and unlatched permitting the insertion and removal of wire strands. In operation, the carrier 70 will be installed near an outer portion of the insert's 65 guided path near the perimeter 22 of the head 20. Because of the cooperation of the ears 75 and teeth 80, the carrier 70 will be prevented from outward travel, and inward travel will be accommodated. As the biased ears 75 travel past the series of teeth 80, a locking action is achieved that prevents the backward movement of the carrier 70. In this way, the carrier 70 achieves forward ratcheted motion inward toward the center 24 or hub of the head 20. After the several wire strands have been twisted toward the center 24 of the head 20, they may be clipped and permitted to disengage from the wire twister 05. Actuating means such as the posts 77 indicated in FIG. 4 on the ears 75 may be manually actuated to disengage the outwardly biased ears 75 from the teeth series 80. In this manner, the carrier 70 may be backed out of the toothed insert 65 and in turn the wire twister 05.

A similar, but alternative embodiment would include a carrier 70 constructed similarly to that shown in FIG. 4. The insert 65, however, would have notches for receiving the upwardly extended posts 77 for fixing relative position locations and establishing one way travel of the carrier 70 and the insert 65. This post-notch combination is either an option additional to the series of teeth 80, or replacements therefore.

It is anticipated that the handle 10, extension shaft 15, and head 20 may be constructed of any suitably rigid material. Advantageously, this material may be insulative and not a conductor of electricity. Alternatively, each component may also be constructed from an electrically conductive material such as steel, provided an insulative barrier is provided between the twister 05 and the operator as indicated in FIG. 6 wherein rubber coating is provided upon the handle 10. The insert 65 and carrier 70 may be most advantageously constructed from a plastic that is semi-rigid but sufficiently elastic to accommodate positioning of the insert 65 into the channels 35 and the flexing cooperation during use of the carrier 70 within the insert 65.

One embodiment of the present inventions is a hand-held wire twister 05. The wire twister 05 includes an upper portion 50 having a handle 10 engageable by an operator for imparting a twisting action to the wire twister 05. There is also a lower portion 55 having a wire strand engaging head 20. The wire strand engaging head 20 is coupled or connected to the handle 10 by an extension shaft 15. The wire strand engaging head 20 is flared outward from the extension shaft 15 so that a perimeter 22 of the head 20 is greater or larger than a perimeter of the shaft 15 so that the head 20 establishes a wire engaging portion 60 of the wire twister 05. Also, the wire engaging portion 60 has at least two wire receiving apertures 30 extending therethrough. The apertures 30 are for engaging at least two wire strands to be connectively intertwined by rotational motion of the wire twister 05.

The apertures 30 of the wire twister 05 may be differently sized for twisting two or more differently sized wires.

Alternatively, the apertures 30 may be similarly sized for twisting two or more similarly sized wires 30.

In one embodiment, the wire receiving apertures 30 are elongate and form a slot 32 into which a wire strand is insertable. The elongate slot 32 is configured to extend from the perimeter of the head 20 toward the extension shaft 15.

In at least one embodiment, radially oblong shaped apertures 30 are radially oblong shaped. In another, they are radially curved.

In another embodiment, the elongate wire receiving apertures 30 each have a greater width at a distal end adjacent to the perimeter of the head and a narrower width at a center of the head. The apertures 30 gradually narrow from the greater width at a distal end adjacent to the perimeter of the head 20 toward the narrower width at the center 24 of the head 20 forming inwardly tapered receiving apertures 30.

In a different embodiment, the invention takes the form of a hand-held wire twister 05 including an upper portion 50 having a handle 10 engageable by an operator for imparting a twisting action to the wire twister 05. A lower portion has a wire strand engaging head 20 that is coupled to the handle 10 by an extension shaft 15. The wire strand engaging head 20 flares outward from the extension shaft 15 so that a perimeter 22 of the head 20 is greater that a perimeter of the shaft 15 so that the head 20 establishes a wire engaging portion 60 of the wire twister 05. The wire engaging portion 60 has at least two wire receiving channels 35 cut thereinto for engaging at least two wire strands to be connectively intertwined by rotational motion of the wire twister 05; each channel 35 engaging one or more wires. Each of the channels 35 extends from an opening at the perimeter 22 of the head 20 toward a center 24 of the head 20.

The two or more elongate wire receiving channels 35 are each radially oriented straight outwardly away from a hub or center 24 of the head 20. Alternatively, the channels 35 may be radially curved outwardly away from a hub 24 of the head 20. In either configuration, the receiving channels 35 may each have a greater width at a distal end of the channel at a location adjacent to the perimeter 22 of the head 20 and a narrower width as the channel 35 approaches the center 24 of the head 20. In the case of narrowing channels 35, the elongate wire receiving channels 35 narrow from the greater width at a distal end adjacent to the perimeter 22 of the head 20 toward a narrower width at the center 24 of the head to form inwardly tapered receiving channels 35.

In these embodiments, the handle 10 may have a substantially horizontally oriented cross-member 11 coupled to the substantially vertically oriented extension shaft 15 to form a graspable portion of the tool 05 for accommodating an operator's grasp for rotating the wire twister 05.

As an option, the invention may include at least one channel 35 having an insert 65 matingly engaged within the channel 35 and at least one carrier 70 configured for guided one-way travel within the insert 65. The insert 65 and the carrier 70 together establish engageable locks for permitting inward travel of the carrier 70 toward the center 24 of the head 20 within the insert 65 and preventing outward travel of the carrier 70 within the insert 65 when engaged therein.

The insert 65 includes a series of teeth 80, each tooth of the series comprising an inclined surface angled toward the hub 24 of the head 20 and a flat surface opposite the inclined surface and facing substantially toward the center 24 of the head 20.

The carrier 70 has flexible outwardly extending ears 75 engageable with the toothed surfaces of the insert 65 for ratcheted inward travel therein. The carrier 70 establishes an enclosure for capturing a strand of wire therein. In one embodiment, the enclosure has a releasable closure member 85 for permitting the insertion of a strand of wire therein for retention during the twisting process.

The alternative embodiments of the present invention described hereinabove are intended for illustrative purposes for the more general design and scope of the invention whose purpose is to facilitate manual twisting of electrical wire strands. While the invention is primarily directed to the manipulation of electrical wiring it is contemplated that it may be used in other industries and environments in which wires for purposes other than electrical conductivity are desired to be twisted together into a combined configuration. Furthermore, the twist has been described herein as being a precursor step to the application of a threaded electrically insulated cap about the twisted portion for assuring the security of the connection. It should be understood that the threaded cap is an option and not a requirement and that the scope of this invention is directed to the design of the hand tool and its use in several environments.

What is claimed and desired to be secured by Letters Patent is as follows:

1. A hand-held wire twister, said wire twister comprising:
   an upper portion comprising a handle engageable by an operator for imparting a twisting action to said wire twister;
   a lower portion comprising a wire strand engaging head, said wire strand engaging head coupled to said handle by an extension shaft;
   said wire strand engaging head being flared outward from said extension shaft so that a perimeter of said head is greater than a perimeter of said shaft so that said head establishes a wire engaging portion of said wire twister;
   said wire engaging portion having at least two wire receiving channels cut thereinto for engaging at least two wire strands to be connectively intertwined by rotational motion of said wire twister;
   each of said channels extending from an opening at said perimeter of said head toward a center of said head;
   at least one of said channels having an insert matingly engaged therein; and
   at least one carrier configured for guided one-way travel within said insert.

2. The hand-held wire twister as recited in claim 1, said wire twister further comprising:
   said at least two elongate wire receiving channels each being radially oriented straight outwardly away from a hub of said head.

3. The hand-held wire twister as recited in claim 1, said wire twister further comprising:
   said at least two elongate wire receiving channels each being radially curved outwardly away from a hub of said head.

4. The hand-held wire twister as recited in claim 1, said wire twister further comprising:

said at least two elongate wire receiving channels each having a greater width at a distal end adjacent to said perimeter of said head and a narrower width approaching said center of said head.

5. The hand-held wire twister as recited in claim 4, said wire twister further comprising:

said at least two elongate wire receiving channels narrowing from said greater width at a distal end adjacent to said perimeter of said head toward said narrower width at said center of said head thereby forming inwardly tapered receiving channels.

6. The hand-held wire twister as recited in claim 1, said wire twister further comprising:

said handle comprising a substantially horizontally oriented cross-member coupled to said substantially vertically oriented extension shaft thereby forming a graspable portion for accommodating an operator's grasp for rotating said wire twister.

7. The hand-held wire twister as recited in claim 1, said wire twister further comprising:

said insert and said carrier having engageable locks for permitting inward travel of said carrier within said insert and preventing outward travel of said carrier within said insert when engaged.

8. The hand-held wire twister as recited in claim 7, said wire twister further comprising:

said insert comprising a series of teeth, each tooth of said series comprising an inclined surface angled toward said hub of said head and a flat surface opposite said inclined surface toward said head center.

9. The hand-held wire twister as recited in claim 8, said wire twister further comprising:

said carrier comprising flexible outwardly extending ears engageable with said toothed surface of said insert for ratcheted inward travel therein.

10. The hand-held wire twister as recited in claim 1, said wire twister further comprising:

said carrier having an enclosure for capturing a strand of wire therein.

11. The hand-held wire twister as recited in claim 10, said wire twister further comprising:

said enclosure comprising a releasable closure member for permitting the insertion of a strand of wire therein and capturing said wire strand therein.

\* \* \* \* \*